April 8, 1930.      E. H. SHIELDS ET AL      1,754,191
OIL CHANGE INDICATOR
Filed Aug. 27, 1928
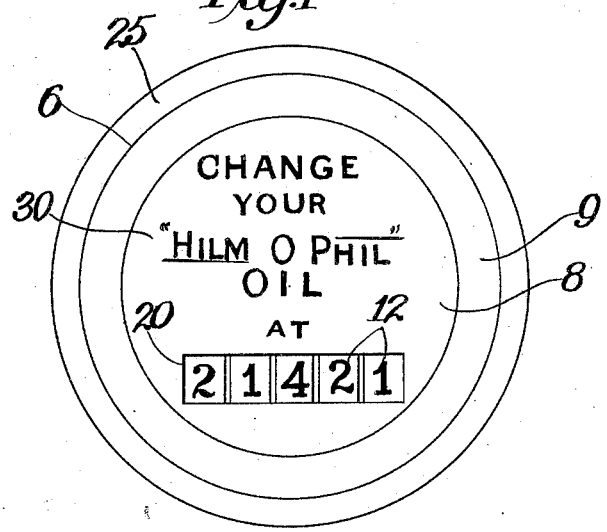
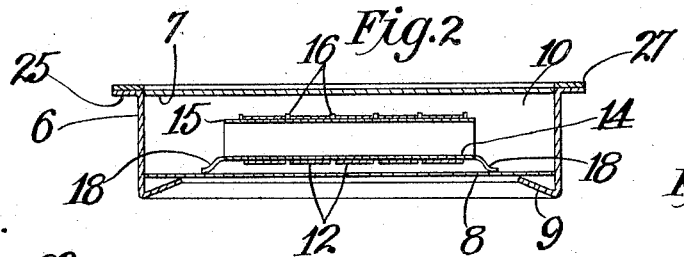
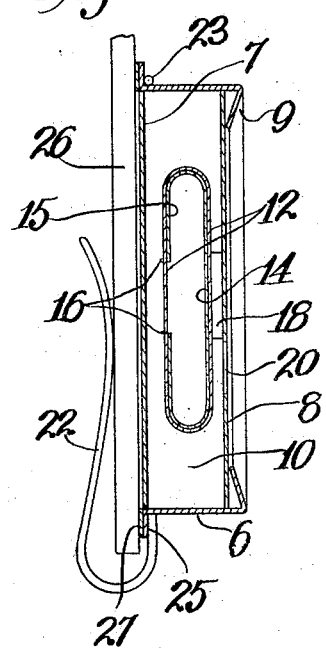
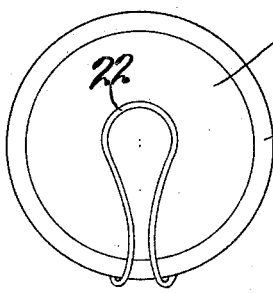
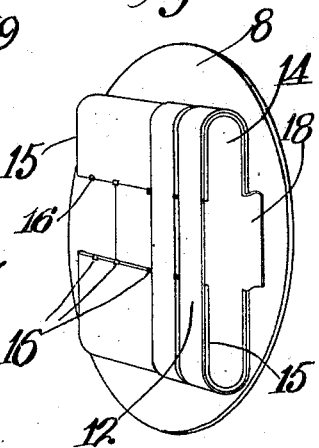
INVENTORS:
Elmer H. Shields and
By Orville E. Suetterlin
Chas W Gerard
their ATTORNEY.

Patented Apr. 8, 1930

1,754,191

UNITED STATES PATENT OFFICE

ELMER H. SHIELDS AND ORVILLE E. SUETTERLIN, OF MARYVILLE, MISSOURI, ASSIGNORS OF ONE-THIRD TO WILLIAM B. PRICE, OF MARYVILLE, MISSOURI

OIL-CHANGE INDICATOR

Application filed August 27, 1928. Serial No. 302,239.

This invention relates to indicator devices, and particularly to an instrument or appliance adapted to afford means for indicating to the operator of an automobile the proper intervals at which the crank case oil of the engine should be drained and changed.

Accordingly, the primary object of the invention is to provide a simple and practical device of this character having indicating elements which may be reset according to the speedometer readings from time to time when the engine oil is changed, and thereby show the next reading of the speedometer when the next change of oil should be made.

In the practical form of embodiment of the invention which we have devised, the instrument comprises a small compact appliance adapted to be quickly and removably attached to the instrument board of an automobile, and the oil change indicating elements or characters are adapted for convenient manipulation by the driver of the car.

With these general objects in view, the invention will now be described by reference to the accompanying drawing illustrating the preferred form of embodiment of our invention, after which those features and combinations deemed to be novel will be set forth and claimed.

In the drawing—

Figure 1 is a front elevation illustrating a device constructed in accordance with our invention;

Figure 2 is a simple, horizontal sectional view;

Figure 3 is a similar vertical sectional view;

Figure 4 is a rear view of the device, on a smaller scale; and

Figure 5 is a perspective view of the interior face of the front plate and elements carried thereby.

Referring now to the drawing in detail, this illustrates the improved instrument as comprising a casing of any suitable material adapted to be conveniently stamped out in the required parts to form the cylindrical housing member 6, the back plate 7 and front plate 8 resting against the front marginal flange 9 of the cylindrical member 6.

Within the housing compartment 10 thus provided, we mount the indicating mechanism which comprises a set of endless ribbons or bands 12, each having a complete set of numerals from 0 to 9 (see Figure 1), these bands being movably mounted upon a spring metal support 14 having the spring lobe portions 15, the end edges of which are formed with spaced nibs or lugs 16 for maintaining the bands 12 separated in slightly spaced and parallel relation. The middle portion of the support 14 is formed with side lugs 18 secured by soldering or the like to the inner face of the plate 8 in position for supporting the bands opposite a window opening 20 in said plate 8, as shown in Figure 1. This opening 20 is of a width sufficient to display a single numeral on any one of the bands 12, and of a length equal to the width of the support 14, for displaying the complete reading as represented by the combined numerals displayed at any one time by the entire set of bands 12.

The spring character of the lobe portions 15 serves to keep the bands in fairly taut relation, and at the same time permit the driver to slide the bands around the support 14 for changing the oil change readings.

For carrying the device in suitable display position, we provide a convenient form of holder, comprising a strand of wire bent or shaped to provide an intermediate spring arm portion 22, and the spring terminal portions 23 encircling the cylindrical housing member 6, which is formed with an exterior marginal flange 25 against which said wire portions 23 are seated when supporting the device. The spring arm 22 is thus adapted to embrace a vertical support, such as the instrument board 26 of an automobile, and the rear face of the flange 25 is preferably faced with suitable cushioning material such as felt 27 or the like, to aid in frictional engagement of the support 26 as well as to protect the same from being scratched or otherwise marred.

It will thus be apparent that we have devised a simple and practical instrument which may be readily and quickly mounted upon the instrument board of an automobile, and conveniently manipulated by the driver for indicating the next reading of the speedometer at which the oil in the engine should be drained and a fresh oil supply renewed. For example, the number "21,421", appearing as the reading in Figure 1, will indicate the next reading of the speedometer when this change should be made, after which the driver of the car, by simply sliding the bands 12 (as by pressure of the finger, or by means of a pencil, or the like) around the support 14 to display the proper numerals through the window opening 20, may indicate the reading corresponding to the next reading of the speedometer at which the next change of oil should be made.

The front face of the plate 8 may be suitably lettered to indicate the function of the instrument, as by use of the lettering shown in Figure 1, and the device is adapted to be so cheaply constructed as to facilitate its distribution and use as a means of advertising, in which case the advertiser would insert the name of his oil brand in the space provided therefor, as indicated at 30, in said view.

While we have illustrated and described what we now regard as the preferred mode of practicing our invention, we desire to reserve the right to make all such changes or modifications as may fairly fall within the scope of the appended claims.

Having thus described our invention, what we claim and desire to secure by Letters Patent is:

1. An oil change indicator device comprising a casing adapted to be mounted in display position and provided with a window opening, a series of endless bands each provided with a set of indicating numerals, and an expansible spring metal holder fixedly positioned within said casing and providing means for tautly supporting said bands in slightly spaced relation to the interior of the casing and permitting sliding adjustment of the bands for variously displaying the numerals thereon through said opening.

2. An oil change indicator device comprising a casing adapted to be mounted in display position and provided with a window opening, a series of endless bands each provided with a set of indicating numerals, and an expansible spring metal holder fixedly positioned within said casing and providing means for tautly supporting said bands in slightly spaced relation to the interior of the casing and permitting sliding adjustment of the bands for variously displaying the numerals thereon through said opening, said holder having projecting spacing nibs for maintaining said bands separated in slightly spaced and parallel relation.

In witness whereof we hereunto affix our signatures.

ELMER H. SHIELDS.
ORVILLE E. SUETTERLIN.